Figure 1:
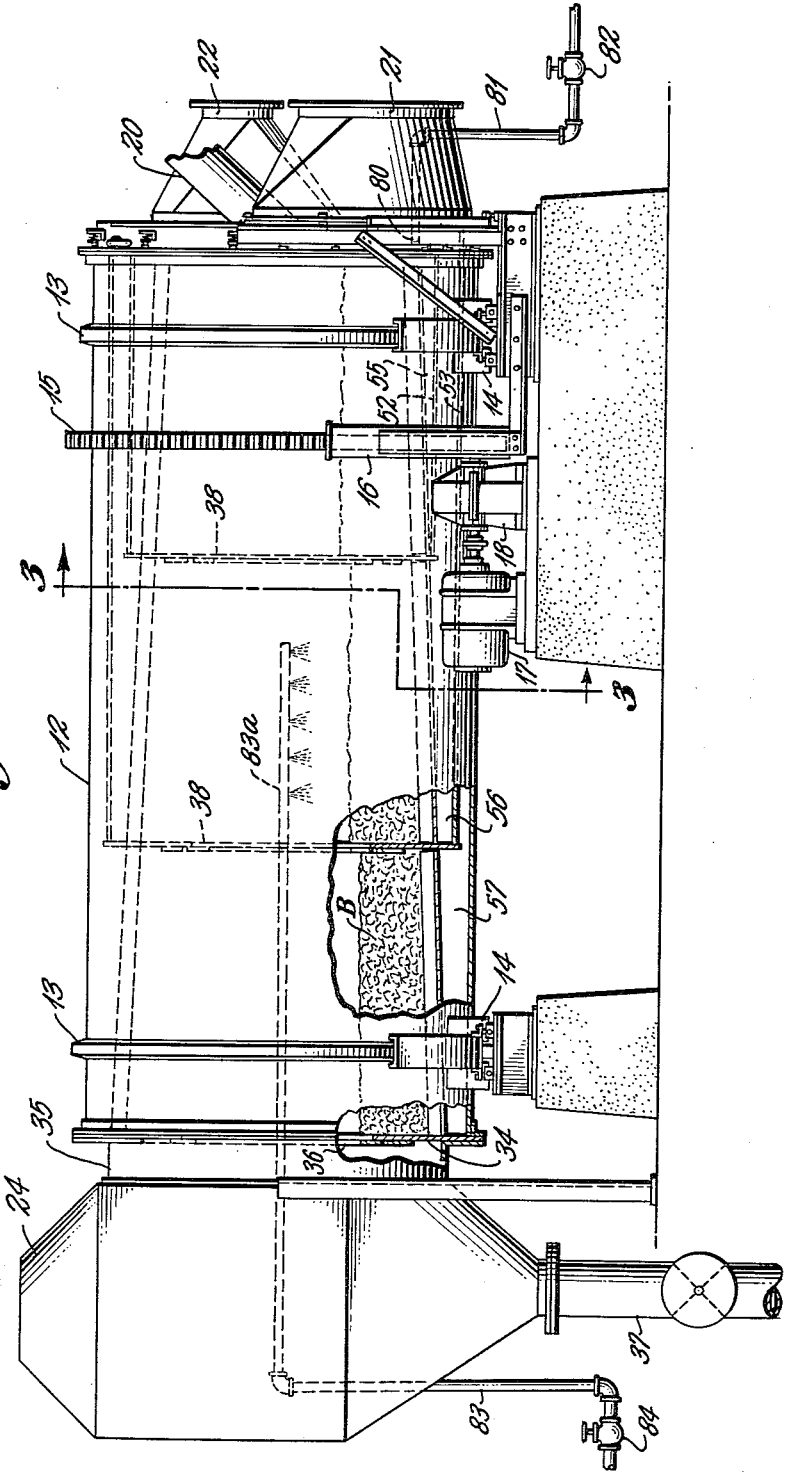

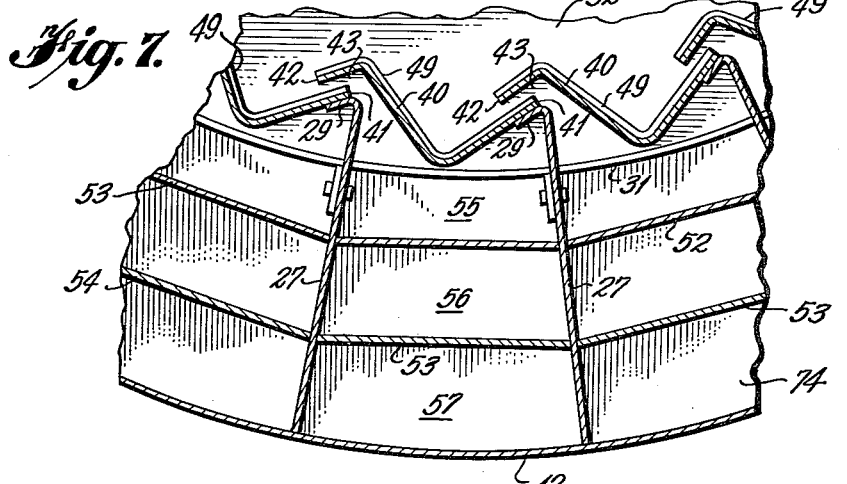
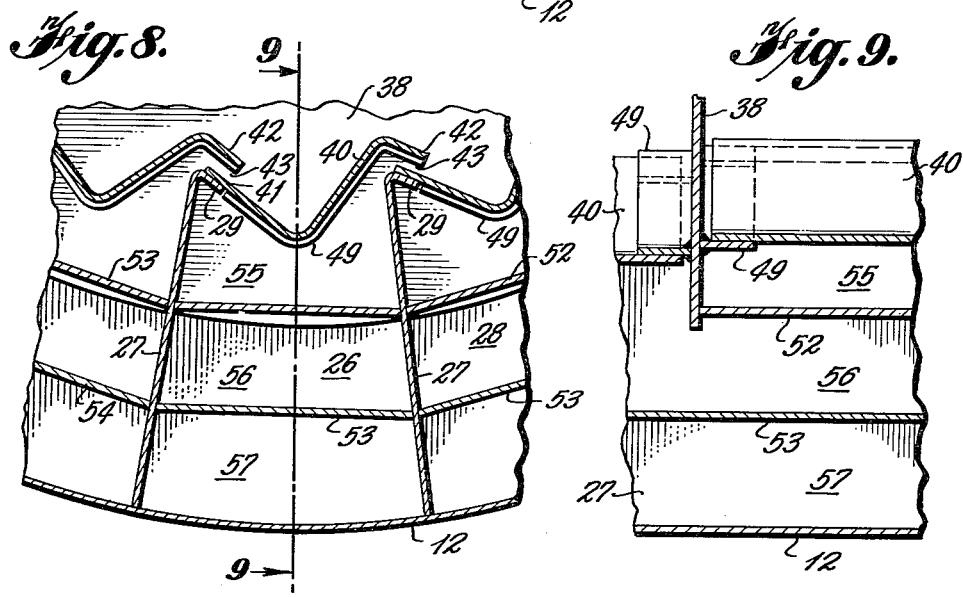
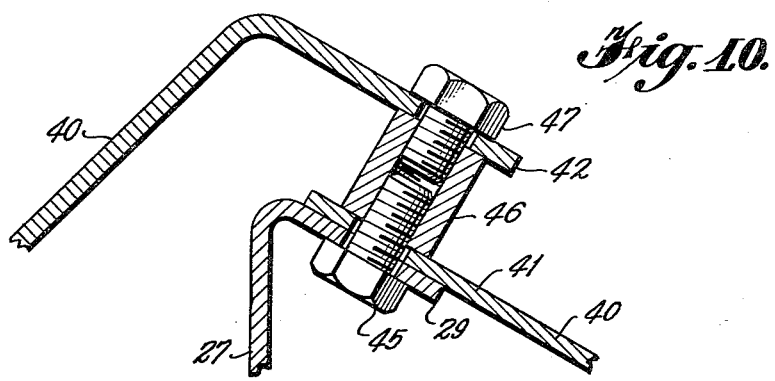

3,050,868
ROTARY COOLERS
Maurice J. Erisman, Oak Park, Ill., Norman L. Francis, Birmingham, Ala., and Earl C. Antonson, Tinley Park, Ill., assignors to Link-Belt Company, a corporation of Illinois
Filed Aug. 7, 1959, Ser. No. 832,229
12 Claims. (Cl. 34—136)

This invention relates to new and useful improvements in rotary coolers, and deals more specifically with horizontally arranged, rotary drum type coolers for treating flowable solids having high initial temperatures.

Rotary drums are widely used today for performing various operations on flowable solid materials, such as chemicals, foodstuffs, and crushed ores, and, because they are readily adaptable to continuous flow processes, are often preferred over other cooling devices. One broad use for such drum type coolers, and that with which this invention is particularly concerned, is to cool materials which are discharged from one step of a treatment process at such a high temperature as to require an appreciable degree of cooling before the material can be subjected to one or more additional process steps, or can be stored or packaged.

The M. J. Erisman et al. patent, No. 2,840,922, issued July 1, 1958, discloses one construction of a horizontally arranged rotary drum designed for cooling purposes. In this drum the material is supported as an elongated bed within a treatment chamber forming structure which includes a shell formed by a plurality of longitudinally extending and circumferentially overlapped material supporting tangential louvres. These louvres are supported inwardly from the shell of the drum by an equal number of radial louvres and are serially arranged concentric with the axis of the drum so as to define an annular space between the shell of the treatment chamber and the shell of the drum. The tangential louvres are also longitudinally inclined radially outwardly relative to the axis of the drum, so that the diameter of the treatment chamber shell increases gradually from the feed end of the drum to the discharge end, which causes the material to flow axially through the drum when the latter is rotated.

To cool the material bed in the drum of the above patent, the annular space between the shell of the drum and the shell of the treatment chamber is divided by the series of radial louvres into a number of longitudinally extending passages which carry air, or other gaseous cooling medium, from an intake manifold at the feed end of the drum to different axially spaced portions of the material bed. From these passages the cooling medium flows through the longitudinally extending spaces left between the circumferentially overlapped portions of the tangential material supporting louvres forming the treatment chamber shell and passes in direct contact through the material bed, providing an intimate heat exchange relationship between the cooling medium and the bed.

Although the cooling drum of the above patent has been found to perform satisfactorily in most applications, in some cases, however, involving a material having an extremely high initial temperature, it has been difficult to provide sufficient cooling to obtain an acceptably low discharge temperature.

The primary object of the present invention is to provide a rotary cooler having a greatly increased capacity for lowering the temperature of highly heated flowable solid materials during a retention period of normal length for treatment equipment of the same type.

Another object of the invention is to provide a rotary cooler employing both gaseous and liquid cooling media in combination to reduce the temperature of the treated materials.

A still further object of the invention is to provide a rotary cooler in which a bed of highly heated flowable solids, continuously advanced axially through the cooler by the rotation of the latter, is subjected to cooling media composed of low temperature air and sprayed water that are delivered in direct heat exchange relation to the bed of solids.

Still another object of the invention is the provision of a horizontally arranged, rotary drum shell type cooler in which a bed of highly heated flowable solids, continuously advanced axially through a treatment chamber formed by a louvred shell positioned concentrically of and in radially, inwardly spaced relation to the drum shell, is subjected, at the middle portion of the chamber, to a cooling medium composed of a mixture of low temperature air and sprayed water that flows between the louvres forming the chamber shell and in direct heat exchange relation through the bed of solids.

A still further object of the invention is to provide for, in the horizontally arranged, rotary drum shell type cooler referred to in the next preceding object, the subjecting of the feed and discharge end portions of the bed of solids to low temperature air which flows between the louvres forming the chamber shell and in direct heat exchange relation through the bed, and the subjecting of the top surface of the said middle portion of the bed of solids to low temperature water that is sprayed thereon.

Other objects and advantages of the invention will be apparent during the course of the following description.

Figure 2:
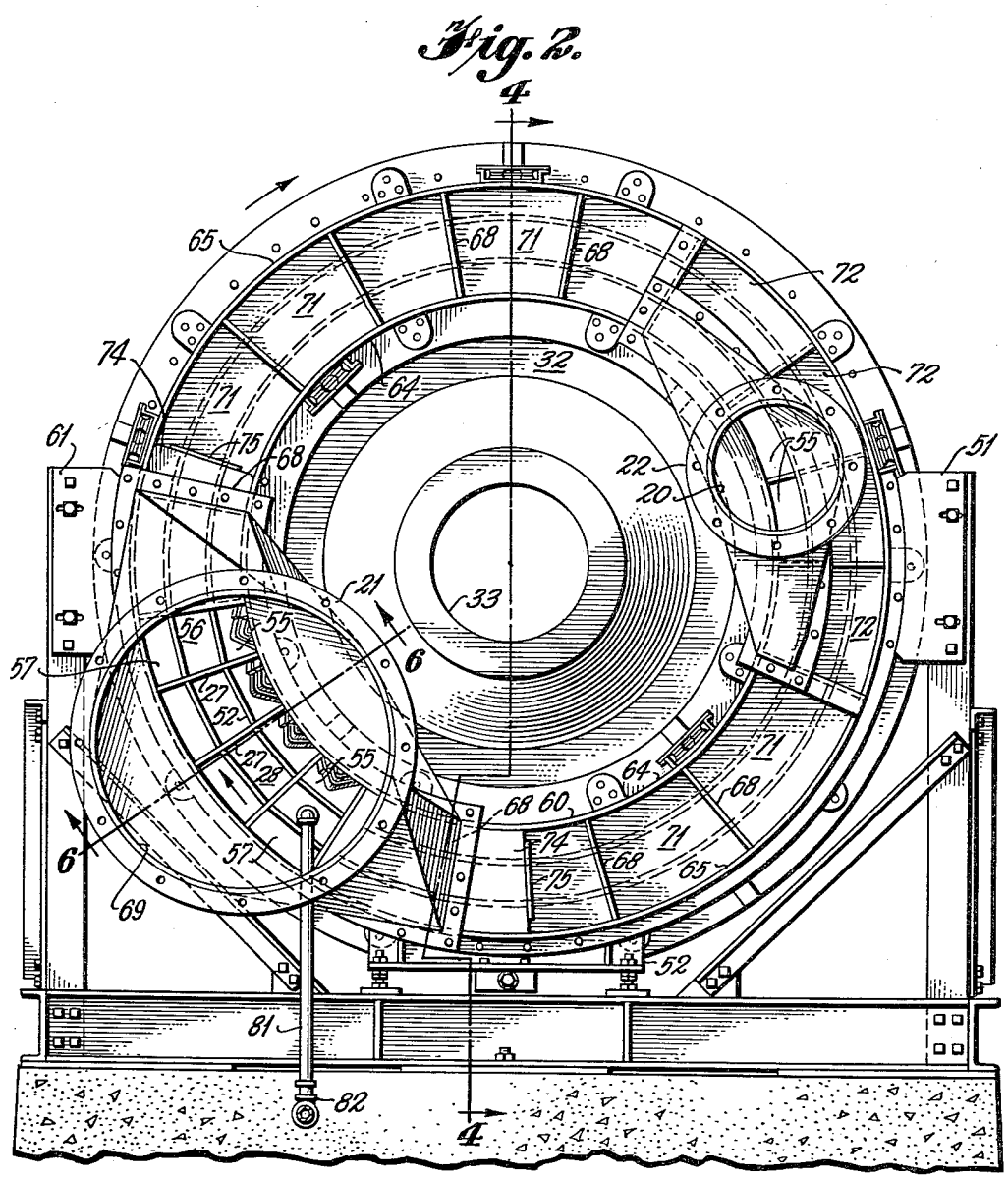
Figure 3:
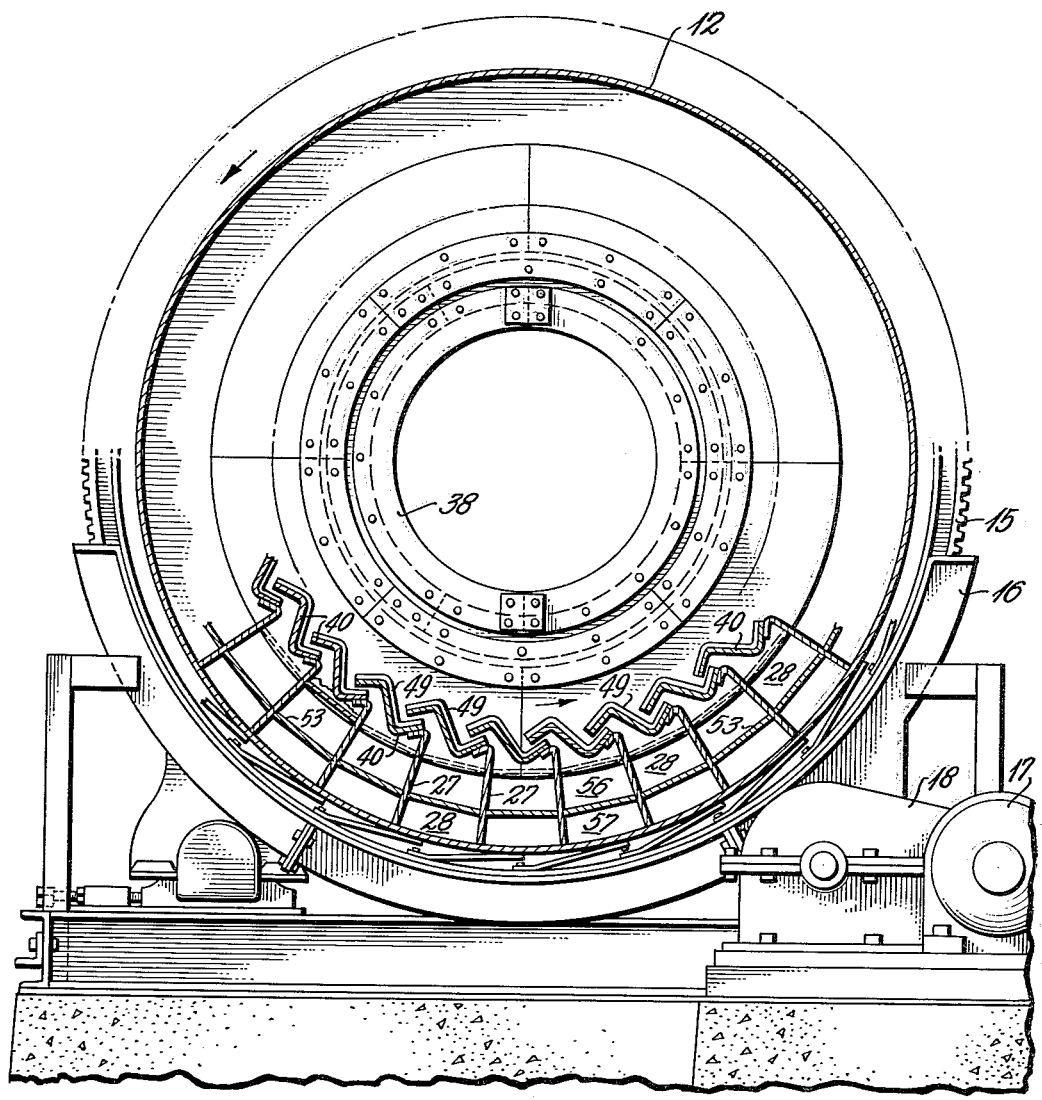

In the accompanying drawings forming a part of this specification and in which like numerals are employed to designate like parts throughout the same, FIGURE 1 is a side elevational view, partly broken away, of a rotary cooler embodying this invention, FIGURE 2 is an end elevational view of the feed end of the cooler illustrated in FIG. 1, FIGURE 3 is a vertical sectional view taken on line 3—3 of FIG. 1.

Figure 4:
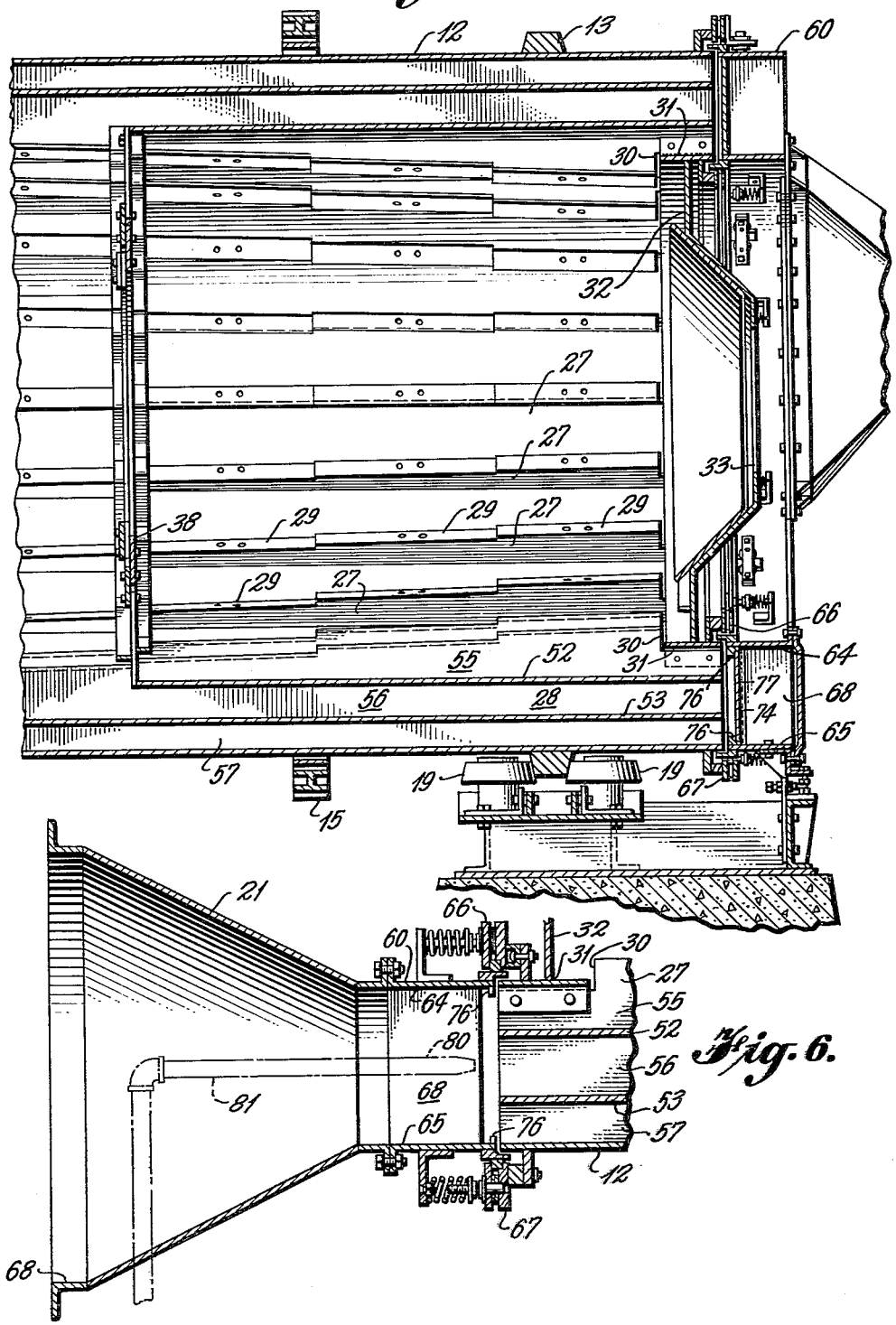

FIGURE 4 is a vertical sectional view taken on line 4—4 of FIG. 2, with the interior of the cooler drum being shown with the tangential louvres removed from the radial louvres.

Figure 5:
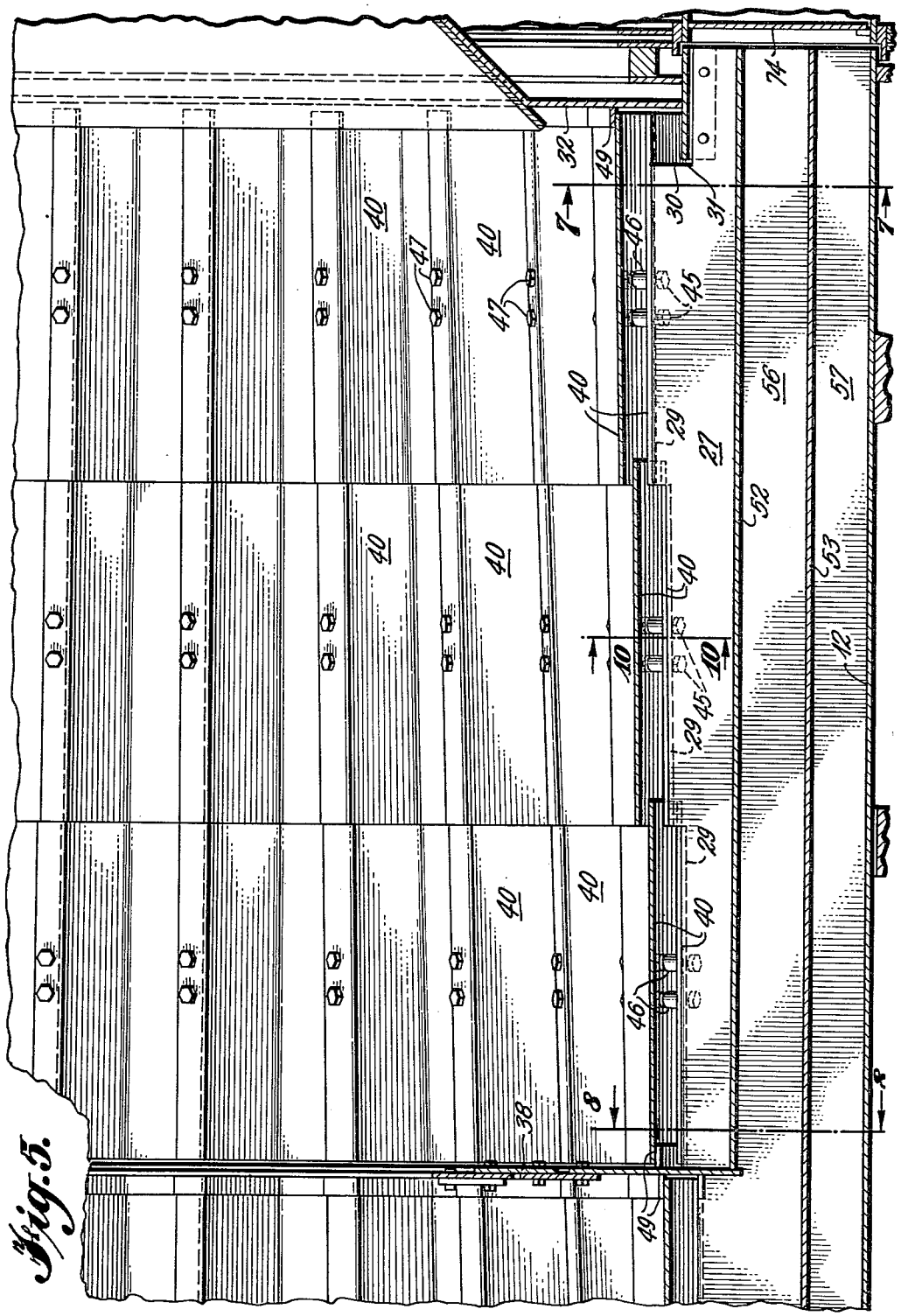

FIGURE 5 is an enlarged fragmentary view of part of the cooler drum interior shown in FIG. 4, with the tangential louvres being shown attached to the radial louvres, FIGURE 6 is a fragmentary sectional view taken on line 6—6 of FIG. 2, FIGURE 7 is a fragmentary sectional view taken on line 7—7 of FIG. 5, FIGURE 8 is a fragmentary sectional view taken on line 8—8 of FIG. 5, FIGURE 9 is a fragmentary sectional view taken on line 9—9 of FIG. 8, and FIGURE 10 is an enlarged fragmentary sectional view taken on line 10—10 of FIG. 5.

In the drawings, wherein for the purpose of illustration is shown the preferred embodiment of this invention, and first particularly referring to FIG. 1, the reference numeral 12 designates the outer cylindrical shell of a drum type cooler with its longitudinal axis horizontally arranged. This drum shell is supported for rotation about its longitudinal axis by two conventional tires 13 and two trunnion bearing assemblies 14 for each tire. Rotation is imparted to the drum shell 12 through a circumferential ring gear 15 driven by a pinion, not shown, within a housing 16 that encloses the lower portion of the ring gear. The pinion in turn is driven by an electric motor 17 through a speed reducer 18. Referring to FIG. 4, it also will be noted that axial movement of the drum shell 12 is prevented by a pair of thrust rollers 19 which engage the opposite sides of one of the tires 13.

Similar thrust rollers may also be provided for engaging the sides of the other tire.

As viewed in FIG. 1, the right-hand end of the drum shell comprises the feed end and includes a chute 20 for introducing material to be cooled to the interior of the treatment chamber shell, an inlet manifold 21 through which the cooling air is delivered to the drum, and an outlet manifold 22 through which a portion of the spent cooling medium is exhausted from the drum. The left-hand end of the drum is provided with a conventional discharge hood 24 through which all of the treated material and the remainder of the spent cooling medium are discharged from the drum.

The interior of the drum shell 12 is provided with structure, a part of which forms a treatment chamber shell that is spaced radially inwardly of and is concentric with the drum shell for supporting the material to be cooled in an elongated bed B between the ends of the treatment chamber shell. As hereinafter described in detail, the cooling air is supplied to the space between the drum shell 12 and the louvred shell of the treatment chamber and flows through openings formed between the louvres to the bottom of the material bed B for passage through the said bed in direct heat exchange relation with the material to be cooled.

Referring first to FIGS. 2, 3 and 4 for a detail description of the structural arrangement within the drum shell 12, it will be noted that the inner surface of the shell 12 has connected thereto a plurality of circumferentially spaced radial louvres 27 which extend axially the full length of said shell so as to define an annular series of axially extending passages 28 around the inner surface of the shell 12. Each of the radial louvres 27 has its inner longitudinal edge portion generally tapered axially of the shell 12 so as to extend radially a greater distance inwardly from the shell 12 at the feed end thereof than at the discharge end. Also, the inner longitudinal edge portion of each of the radial louvres 27 is provided with a series of stepped flanges 29 which are located successively along its length, as seen best in connection with the radial louvres shown in FIG. 4.

Adjacent the feed end of the drum shell 12 the inner edge portions of the radial louvres 27 are relieved as at 30, FIG. 4, to accommodate a ring 31 which is connected to the louvres. The ring 31 serves to support a feed end plate 32 which has a centrally located opening 33 through which material may be introduced to the interior of the shell. At the discharge end of the shell 12, see FIG. 1, there is provided an end plate 34 and a discharge spout 35 which projects axially outwardly from the plate 34 in surrounding relationship with the discharge opening 36 of the latter. The outer end of the discharge spout 35 opens into the discharge hood 24 and the material entering the hood is discharged through a bottom spout 37. Spent cooling medium flowing from the discharge end of the shell 12 is released from the upper portion of the discharge hood 24.

Between the feed end plate 32 and the discharge end plate 34, the length of the drum shell 12 is divided into three successive portions by means of two longitudinally spaced ring dam assemblies 38 which are mounted on and extend radially inwardly from the radial louvres 27. The construction of the ring dam assemblies 38 may be substantially the same as that shown by the patent to M. J. Erisman, et al., No. 2,840,922, issued July 1, 1958, and consequently reference may be made to this patent for a more detailed disclosure of these assemblies. At this point, however, it may be noted that the openings provided by the feed end plate 32, the two ring dam assemblies 38 and the discharge end plate 34 are of progressively larger size from the feed end to the discharge end of the shell 12.

Referring particularly to FIGS. 5 and 7, it will be observed that within the portion of the drum shell 12 extending between the feed end plate 32 and the first ring dam assembly 38, each radial louvre 27 has its longitudinal edge portion formed with three stepped flanges 29 and that each flange supports one longitudinal edge portion of a treatment chamber shell forming tangential louvre section 40 which bears against the flange. Each of the tangential louvre shell sections 40 is somewhat longer than its supporting flange 29 so that the adjacent end portions of each pair of axially aligned tangential louvre shell sections are overlapped, with said overlapped end portions being radially spaced due to the stepped arrangement of the flanges 29.

As best seen in FIGS. 7 and 8, the leading longitudinal edge portion 41 of each tangential louvre section 40 bears against and is supported by one of the flanges 29 of a radial louvre 27. From its flange supported edge, each tangential louvre section extends rearwardly with respect to the direction of rotation of the drum shell 12 and inwardly relative to the drum shell axis so that its trailing longitudinal edge 42 circumferentially overlaps and is spaced radially inwardly of the leading edge 41 of the next succeeding tangential louvre section so as to provide a treatment fluid outlet opening 43 which faces rearwardly with respect to the direction of drum shell rotation. The cross-sectional configuration of each of the tangential louvre sections 40 is such as to suggest the letter M when considered in connection with its two associated radial louvres 27, and for that reason the tangential louvre section may be referred to as M-shaped.

As seen best in FIGS. 5 and 10, the tangential louvre sections 40 are connected at their middle portions to the stepped flanges 29 of the radial louvres so that the tangential louvres are free to expand and contract relative to the flanges 29 in response to temperature changes. In the illustrated embodiment, each such connection includes two axially spaced bolts 45 which pass through registering openings in the flange 29 and the leading edge 41 of a tangential louvre section and are threaded into the ends of two spacers 46. Two additional bolts 47 pass through openings in the overlapped trailing edge portion 42 of the adjacent tangential louvre section 40 and are threaded into the other ends of the spacers 46. Each tangential louvre section 40 is therefore supported at both its leading and trailing edges on the flanges 29 of the radial louvres 27.

Although FIG. 5 shows only the portion of the drum shell adjacent its feed end, it is to be understood that the remaining two portions of the drum are similarly constructed with three axially overlapped tangential louvre sections. As seen in FIGS. 3, 4, 5 and 7 to 9, supporting and sealing strips 49 are suitably mounted on the feed plate 32, the ring dam assemblies 38 and the discharge end plate 34 to slidably engage the adjacent end portions of the tangential louvre shell sections 40.

It will now be evident that the tangential louvre sections 40 collectively define the shell of the treatment chamber for supporting the material bed B and that the ring dam assemblies 38 divide the material bed into three successive, axially arranged portions. It will also be recalled that the radial louvres 27 divide the space between the tangential louvre sections 40 and the drum shell 12 into an annular series of passages 28. In further accordance with the invention, each of the passages 28 is divided into three cooling medium sections each of which supplies cooling medium to a different one of the three axially arranged portions of the bed.

Referring to FIGS. 4 and 7, each of the passages 28, adjacent the feed end of the drum shell 12, is provided with an inner partition 52 and an outer partition 53. Each of these partitions extends generally circumferentially of the drum shell 12 between the two associated radial louvres 27 and thereby divides the passages 28 into inner, intermediate and outer sections 55, 56 and 57, respectively.

The inner partition 52 of each passage 28 extends axially from the feed end of the drum shell 12 to the first ring dam assembly 38, see FIGS. 4, 5 and 7 to 9.

This ring dam assembly extends radially outwardly of the treatment chamber forming tangential louvre sections 40 a sufficient distance to engage the inner ends of the inner partitions 52, thereby closing the inner ends of the inner sections 55 of the passages 28. Therefore, it will be apparent that cooling medium supplied to the inner sections 55 will be confined to the first axially arranged portion of the material bed B and that it will be separated from the cooling medium supplied to the other portions of the bed.

The outer partition 53 of each passage 28 extends from the feed end of the drum shell 12 to the second ring dam assembly 38, see FIG. 1, with this ring dam assembly being extended outwardly beyond the tangential louvre sections 40 so as to engage the inner ends of the outer partitions 53 and thereby close the inner ends of the intermediate sections 56 of the passages 28. Therefore, cooling medium supplied to the intermediate sections 56 will be confined to the middle axial portion of the bed B and, similarly, it is evident that cooling medium supplied to the outer sections 57 of the passages 28 will be conducted to the axial portion of the material bed B adjacent the discharge end of the drum shell 12 and confined to flow through the bed at this location. The cooling medium is released from each of the sections 55, 56 and 57 by the outlets 43 between the overlapped edges of the tangential louvre sections, as described above.

Gaseous cooling medium, such as low temperature air, is supplied to the sections 55, 56 and 57 through the inlet manifold 21 which, as best seen in FIGS. 2 and 6, is bolted to a distributing ring assembly 60 that is mounted in a stationary position adjacent the feed end of the drum shell 12 on opposite side brackets 61 and on a bottom bracket 62. The distributing ring assembly 60 is formed of concentrically arranged and radially spaced inner and outer rings 64 and 65, respectively, which are aligned with the ring 31 and the shell 12 in closely spaced relationship therewith. A suitable seal assembly 66 is provided to prevent the escape of cooling medium through the space between adjacent ends of the inner ring 64 and the ring 31 and a similar seal assembly 67 is provided to prevent the escape of cooling medium from between the adjacent ends of the outer ring 65 and the drum shell 12. The inner and outer rings 64 and 65 are supported in their concentric relationship by radially arranged webs 68 which extend between and are connected to the rings.

The material bed B supported in the treatment chamber shell, that is formed by the tangential louvres 40, is carried upwardly partly around the chamber shell by the rotation of the drum. As illustrated in FIG. 2, therefore, the inlet manifold 21 is so located that its opening 69 is aligned with the sections 55, 56 and 57 of the passages 28 that are positioned, at any given time, radially outwardly of the location of the material bed B in the rotating drum. Also, the outlet manifold 22, which is connected to the distributing ring assembly 60, is located so that its opening 70 is only aligned with the sections 55 of the passages 28 which are spaced circumferentially from the location of the material bed B in the rotating drum. Between the ends of the inlet manifold 21 and the outlet manifold 22, the distributing ring assembly 60 includes closure plates 71 between the webs 68 and the rings 64 and 65 which serve to close the ends of the sections 55, 56 and 57 of the passages 28 that are not aligned with the manifolds. Also, it will be noted that the opening 70 of the outlet manifold 22 is prevented from communicating with the ends of the sections 56 and 57 of the passages by closure plates 72 which extend between the webs 68, the outer ring 65 and the manifold 22.

To vary the effective circumferential length of the inlet manifold 21, the distributing ring assembly 60 is provided with two damper plates 74 located one at either end of the inlet manifold. These damper plates have arcuate inner and outer edges so as to slidably fit between the inner and outer rings 64 and 65, and include manipulating flanges 75 on their outer ends to permit their adjustment. As indicated in FIG. 4, the inner face of each damper plate 74 slidably engages two guides 76 connected one to each of the inner and outer rings 64 and 65. The outer face of each damper plate 74 is spaced inwardly of the inner edge of one of the webs 68 and a seal 77 of asbestos, or the like, is provided between the web and the damper to prevent the escape of cooling medium from between the damper and the web.

From FIG. 2 it will be apparent that an adjustment of the dampers 74 will have approximately an equal effect on the amount of cooling medium supplied to each annular series of sections 55, 56 and 57 of the passages. If it should be desired to independently regulate the supply of cooling medium to each of the series of sections 55, 56 and 57, it, of course, will be apparent that separate dampers could be provided for each series, such dampers being constructed and supported in a manner similar to the individual dampers shown in the patent to M. J. Erisman et al., No. 2,840,922, issued July 1, 1958.

In addition to the use of a gaseous cooling medium supplied through the inlet manifold 21 to the material bed B, the present invention also contemplates the use of a liquid cooling medium in combination with the gaseous medium to effect an increased reduction in the temperature of the material in the bed B. This liquid cooling medium, such as water, is introduced to the drum shell 12, as shown best in FIGS. 1, 2 and 6, by a nozzle 80 located within the inlet manifold 21 and connected by means of piping 81 and a shut-off valve 82 to a source of the liquid cooling medium, not shown. The nozzle 80 is so positioned that the spray of liquid discharged therefrom is directed only into the intermediate sections 56 of the passages 28 as they move into alignment with the nozzle when the drum shell is rotated.

It will be recalled, that the intermediate sections 56 communicate with the middle portion of the material bed B and therefore only this portion is supplied with a combination of both the gaseous and the liquid cooling medium. The liquid spray emitted from the nozzle 80 is entrained by the gaseous cooling medium supplied to the sections 56 through the inlet manifold and is carried thereby either in an atomized or vaporized state to the material bed. Generally, part or all of the liquid spray vaporizes in the sections 56. This reduces the temperature of the gaseous cooling medium below what it would otherwise attain and therefore increases its cooling effect on the material in the bed B. Whatever part of the liquid spray that does not vaporize in the sections 56 is carried by the gaseous medium in direct heat exchange relation through the material of the bed where it will be vaporized by the absorption of heat from the material, causing a reduction in the temperature of the material.

The middle portion of the material bed B is spaced from the discharge end of the drum shell by the portion of the bed B located between the second ring dam assembly and the discharge end plate 34 and which is supplied with gaseous cooling medium through the sections 57. It will be evident, therefore, that if the starting material is hot enough, any unvaporized liquid spray that is retained by the material that has passed through the middle portion of the bed will be completely vaporized as such moistened material traverses the final portion of the bed and will be driven from the material by the gaseous medium supplied to the bed through the sections 57. Thus, if the material supplied to the inlet end of the drum shell 12 is at the contemplated high temperature, the material discharged from the drum will be in a completely dry condition despite the use of the liquid cooling medium.

The liquid spray supplied to the sections 56 also serves another important function in the present cooler. Referring to FIG. 1, it will be noted that the outer sections 57 of the passages 28, which are supplying gaseous cooling medium to the portion of the material bed adjacent the discharge end of the shell 12, are separated from the feed and middle portions of the material bed B by the intermediate sections 56. Therefore, the low temperature air and water spray mixture in the sections 56 provides an insulating shield which serves to reduce the transfer of heat between the material bed and the air supplied to the sections 57. The air in the sections 57 is accordingly maintained at the desired low temperature until it reaches the material bed B and therefore has a greater cooling effect than would otherwise be the case.

Referring again to FIG. 1, it will be noted that additional liquid cooling medium such as water, is supplied to the material bed by suitable piping 83 which extends through the exhaust hood 24 and axially of the drum shell 12 into the middle portion of the material bed B. A shut-off valve 84 controls the flow of liquid medium in the piping 83 and the liquid is sprayed through a plurality of openings or nozzles located in the end portion 83a of the piping 83 above the middle portion of the material bed. The liquid is sprayed onto the surface of the material bed and, due to the agitated nature of the bed, is intimately mixed with the material. The heat of the material will vaporize the liquid which in turn will further assist in cooling the material. The water vapor will be driven from the material by the time the latter reaches the discharge end of the drum.

Referring now to FIG. 1 for a detail description of the operation of the cooler illustrated therein, the material forming the bed is introduced into the drum shell 12 through the chute 20. Due to the longitudinal taper of the radial louvres 27, the treatment chamber shell provided by the tangential louvre sections 40 increases in diameter from the inlet end to the discharge end of the drum shell 12, and, therefore, as the drum shell is rotated the material will be advanced through the treatment chamber shell as it gently flows downwardly over itself. The ring dam assemblies 38 divide the material bed B into three successively arranged portions along the length of the treatment chamber shell and regulate the depth of the bed in each of these portions.

As the drum shell 12 is slowly rotated, the material bed is carried partly up one side of the treatment chamber shell a certain angular distance depending on the angle of repose of the material being treated. The damper plates 74 must, therefore, be positioned so that the opening therebetween is aligned with only the sections 55, 56 and 57 of the passages 28 which lie radially outwardly of the bed of material.

As the drum shell 12 is rotated, gaseous cooling medium is supplied under pressure to the inlet manifold 21 from which it flows through the sections 55, 56 and 57 of the passages 28 aligned therewith to the three successively arranged portions of the material bed associated respectively with each of the said sections. At the same time, liquid cooling medium is sprayed into the sections 56 aligned with the nozzle 80 where it is entrained by the gaseous cooling medium and carried to the middle portion of the material bed. Vaporization of the liquid cooling medium in either the sections 56 or in the material bed B serves to cool the material, while the presence of the liquid in the sections 56 also serves to insulate the gaseous cooling medium in the sections 57 from the heat of the material forming the bed.

In addition to the supply of gaseous cooling medium to the bottom surface of the material bed B through the sections 55, 56 and 57 and liquid cooling medium to the bottom of the bed through the sections 56, liquid cooling medium is also sprayed onto the upper surface of the material bed along the middle portion thereof from the piping 83. This last mentioned liquid cooling medium also vaporizes in the material bed and causes the cooling thereof. As it travels the distance from the middle portion of the material bed to the discharge end of the drum shell 12, all of the liquid in the material is vaporized and driven therefrom so that the material is discharged completely dry.

The material introduced to the feed end of the drum shell 12 has the greatest temperature and, for that reason, the cooling medium that passes through this part of the bed will be heated to a high temperature. If this hot medium were permitted to flow through the drum to the discharge hood 24, it would reheat the material in the middle and discharge portions of the bed and thereby would materially reduce the effectiveness of this cooling apparatus. This highly heated portion of the cooling medium is therefore withdrawn from the feed end of the shell 12 through the exhaust manifold 22 and the sections 55 aligned therewith. On the other hand, the cooling medium that passes through the middle and discharge portions of the material bed B are exhausted through the discharge hood 24.

It is to be understood that the form of this invention herewith shown and described is to be taken as the preferred example of the same, and that various changes in the shape, size and arrangement of parts may be resorted to without departing from the spirit of the invention or the scope of the subjoined claims.

Having thus described the invention, we claim:

1. A rotary cooler, comprising a horizontal drum shell, a shell positioned concentrically of and in radially, inwardly spaced relation to the drum shell to form a central treatment chamber, annular means for dividing the treatment chamber into three successive axially arranged portions which are in communication with each other, means for feeding flowable solid material into one end of the treatment chamber shell to form a bed that advances successively through the said three portions of the chamber shell as the drum shell is rotated, means for discharging the material from the opposite end of the chamber shell, means including the drum and chamber shells for separately flowing cooling air upwardly through the three parts of the material bed that are advancing through the three portions of the said chamber shell, and means for applying a sprayed cooling liquid to the part of the bed that is advancing through the intermediate one of the said three portions of the chamber shell.

2. A rotary cooler as defined in claim 1 further characterized by the means for applying a sprayed cooling liquid including a device to mix said liquid with the cooling air that is flowing upwardly through the part of the material bed that is advancing through the intermediate one of the said three portions of the chamber.

3. A rotary cooler as defined in claim 2 further characterized by the means for applying a sprayed cooling liquid also including a device arranged to direct cooling liquid onto the top of the part of the material bed that is advancing through the intermediate one of the said three portions of the chamber.

4. A rotary cooler as defined in claim 1 further characterized by a plurality of axially extending radial louvres spaced circumferentially around the inner surface of the drum shell to provide an annular series of radially inwardly opening treatment fluid passages extending the full length of the drum shell, the inner longitudinal edge portion of each radial louvre being shaped to provide a series of separate flanges which are stepped radially outwardly relative to each other and successively from the feed end to the discharge end of the drum shell, a tangential louvre section supported at one longitudinal edge portion on each flange of each radial louvre with the adjacent tangential louvre sections on each radial louvre having their end portions overlapped, and means for fastening the middle portion of each tangential louvre section to its radial louvre flange so the tangential and radial louvres may expand and contract longitudinally relative to each other due to temperature changes.

5. A rotary cooler as defined in claim 4 further characterized by the tangential louvre sections projecting laterally from their supporting radial louvres and circumferentially of, and opposite to, the direction of rotation of the drum with the trailing edge portion of each tangential louvre section overlapping the leading edge portion of the next adjacent circumferentially aligned tangential louvre section, and means for connecting the middle portions of the said overlapping edges of the tangential louvres.

6. A rotary cooler, comprising a horizontally arranged drum shell mounted for rotation about its longitudinal axis, a plurality of axially extending louvre assemblies spaced circumferentially around the inner surface of said drum shell to provide an annular series of treatment fluid passages and a central treatment chamber shell with an outlet extending the full length of each of said fluid passages and opening into said chamber shell, a feed end plate mounted across one end of said drum and having a central opening for the introduction of material to form an axially extending bed in said chamber shell, first and second ring dam assemblies mounted on said louvre assemblies at axially spaced points along said drum and extending inwardly of the latter to control the axial flow of the material in said bed, first partition means circumferentially spanning a portion of each of said fluid passages and extending from adjacent said feed end plate to the first ring dam assembly to provide said portions with inner sections, second partition means spanning a portion of each of said fluid passages and extending from adjacent said feed end plate to the second ring dam assembly to divide the said fluid passage portions into intermediate and outer sections, a stationary cooling air supply manifold mounted in sealed relationship with said feed end plate and the associated end of said drum shell, said manifold having an inlet opening aligned with the inner, the intermediate and the outer sections of the fluid passages which are positioned radially outwardly of the location of the material bed so that cooling air will flow through the said passage outlets and upwardly through the material bed, an exhaust opening aligned with the inner sections of a plurality of passages that are spaced circumferentially from the location of the said material bed, means for closing the adjacent ends of the passages that are out of alignment with said inlet and exhaust openings, and means for applying sprayed cooling liquid to the portion of the material bed that is located between the first and second ring dam assemblies.

7. A rotary cooler as defined in claim 6 further characterized by the means for applying a sprayed cooling liquid including a device to mix said liquid with the cooling air that is flowing upwardly through the portion of the material bed that is located between the first and second ring dam assemblies.

8. A rotary cooler as defined in claim 7 further characterized by the means for applying a sprayed cooling liquid also including a device arranged to direct cooling liquid onto the top of the portion of the material bed that is located between the first and second ring dam assemblies.

9. A rotary cooler as defined in claim 8 further characterized by the exhaust opening withdrawing from the feed end portion of the central treatment chamber the spent cooling air that has become highly heated by passing through the hottest portion of the material bed.

10. A rotary cooler as defined in claim 6 further characterized by the louvre assemblies comprising a plurality of axially extending radial louvres spaced circumferentially around the inner surface of the drum shell to provide an annular series of radially inwardly opening treatment fluid passages extending the full length of the drum shell, the inner longitudinal edge portion of each radial louvre being shaped to provide a series of separate flanges which are stepped radially outwardly relative to each other and successively from the feed end to the discharge end of the drum shell, a tangential louvre section supported at one longitudinal edge portion on each flange of each radial louvre with the adjacent tangential louvre sections on each radial louvre having their end portions overlapped, and means for fastening the middle portion of each tangential louvre section to its radial louvre flange so the tangential and radial louvres may expand and contract longitudinally relative to each other due to temperature changes.

11. A rotary cooler as defined in claim 10 further characterized by the tangential louvre sections projecting laterally from their supporting radial louvres and circumferentially of, and opposite to, the direction of rotation of the drum with the trailing edge portion of each tangential louvre section overlapping the leading edge portion of the next adjacent circumferentially aligned tangential louvre section, and means for connecting the middle portions of the said overlapping edges of the tangential louvres.

12. A rotary cooler as defined in claim 10 further characterized by supporting and sealing means mounted on the first and second ring dam assemblies and the feed end plate for slidingly engaging the adjacent end portions of the tangential louvre sections.

References Cited in the file of this patent

UNITED STATES PATENTS

| | | |
|---|---|---|
| 1,200,220 | Mudge | Oct. 3, 1916 |
| 1,732,819 | Pherson | Oct. 22, 1929 |
| 1,844,782 | Mittag | Feb. 9, 1932 |
| 2,294,780 | Pfening | Sept. 1, 1942 |
| 2,774,587 | Mayenschein et al. | Dec. 18, 1956 |
| 2,840,922 | Erisman et al. | July 1, 1958 |